US009401998B2

(12) United States Patent
Rienzo et al.

(10) Patent No.: US 9,401,998 B2
(45) Date of Patent: Jul. 26, 2016

(54) ROBUST DTMF DETECTION IN AN UNRELIABLE VOICE-OVER-IP (VOIP) ENVIRONMENT

(71) Applicant: Soundbite Communications, Inc., Bedford, MA (US)

(72) Inventors: Christopher M. Rienzo, Waltham, MA (US); Brian P. Davis, Arlington, MA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 421 days.

(21) Appl. No.: 13/717,209

(22) Filed: Dec. 17, 2012

(65) Prior Publication Data

US 2014/0169550 A1    Jun. 19, 2014

(51) Int. Cl.
*H04L 12/66* (2006.01)
*H04M 7/12* (2006.01)
*H04Q 1/453* (2006.01)

(52) U.S. Cl.
CPC ............. *H04M 7/1295* (2013.01); *H04Q 1/453* (2013.01)

(58) Field of Classification Search
CPC ..... H04M 7/006; H04M 7/1295; H04L 12/66

USPC .................................................. 379/352–356
See application file for complete search history.

(56) References Cited

U.S. PATENT DOCUMENTS

| 6,650,662 | B1 * | 11/2003 | Arnaud et al. | 370/352 |
| 6,775,265 | B1 * | 8/2004 | Oran | 370/352 |
| 7,039,044 | B1 * | 5/2006 | Whitfield et al. | 370/356 |
| 2008/0192623 | A1 * | 8/2008 | Chen | 370/212 |
| 2010/0256979 | A1 * | 10/2010 | Freund et al. | 704/270 |
| 2013/0242978 | A1 * | 9/2013 | Prodanovic | 370/352 |

* cited by examiner

*Primary Examiner* — Nafiz E Hoque
(74) *Attorney, Agent, or Firm* — Lewis Roca Rothgerber Christie LLP

(57) ABSTRACT

A method to discriminate a signal as a DTMF digit is operative in a service provider having a VoIP-based media server. The media server accepts both in-band DTMF and RTP telephone events. A digit detection module receives as input a data stream that may include one or more DTMF digits. The module processes the input data stream and provides, as output, an indication of what digit(s) have been detected and from what source (e.g., in-band audio, an RTP 2833 telephone event, of both). The output is then further processed by a discrimination algorithm to make a final digit determination. If RTP telephone events are detected, the algorithm prefers them and ignores in-band DTMF until the call ends or the media is re-negotiated. The approach detects when duplicate digits of differing types are initially received and only accepts one of them, regardless of spacing or duration.

12 Claims, 4 Drawing Sheets

ROBUST DTMF DETECTION IN AN UNRELIABLE VOICE-OVER-IP (VOIP) ENVIRONMENT

BACKGROUND OF THE INVENTION

1. Technical Field

This disclosure relates generally to telephone number identification.

2. Description of the Related Art

It is known to provide a web-based hosted ("platform-as-a-service") solution through which business entities create and manage interactive or notification communications campaigns. An example of an interactive communications campaign is a telephone campaign to determine whether a target recipient desires to transfer a credit card balance to a new account, a campaign to remind a recipient that a credit card payment is due and to offer the recipient an opportunity to speak with a customer representative concerning any payment issues, or the like. The hosted solution typically is implemented as an application (or "managed") service provider. One or more business entities ("clients") that desire to use the service typically register and access the service through an on-line (e.g., web-based) portal. In one representative use scenario, the managed service provider entity provides outbound telemarketing services on behalf of participating clients. The campaign typically is provisioned by the client. Thus, for example, using a web-based interface, a participating client defines a script for the campaign, imports a set of contacts, and defines one or more parameters that govern how the campaign is to be run. At a designated time, the service provider initiates the campaign, e.g., by providing the contacts to a set of telephone servers that set-up and manage the telephone calls to the targets of the campaign. During a given outbound call, as noted above, a recipient (a "customer") may be afforded an option to connect to a contact center, e.g., to speak to a customer representative, typically by entering a digit on a keypad.

Dual-tone multi-frequency signaling (DTMF) is used for telecommunication signaling over analog telephone lines in the voice-frequency band between telephone handsets and other communications devices and a telephone switching center. A DTMF keypad (typically corresponding to the buttons on a phone) is laid out in a 4×4 matrix, with each row representing a low frequency, and each column representing a high frequency. DTMF tones are generated by combining two tones each of different frequency, which occurs when a user presses a digit in the keypad. In conventional TDM-based telephone systems, DTMF tones can be heard in any conversation or audio recording on the line. As such, the tones are sometimes referred to as in-band signaling because the same channel used to send the voice conversation is also used for the signaling tones.

Voice over IP (VoIP, or voice over Internet Protocol) commonly refers to the communication protocols, technologies, methodologies, and transmission techniques involved in the delivery of voice communications and multimedia sessions over Internet Protocol (IP) networks, such as the Internet. Communications over VoIP are typically a continuous stream of data packets that are delivered via a low level communication protocol called RTP (Real-Time Transport Protocol). VoIP calls also conform (at a higher communication layer) to the Session Initiation Protocol (SIP). Because SIP does its signaling over Internet Protocol (IP)-based networks as packet data, it is not necessary to have in-band transmission of DTMF tones. Instead, SIP calls transmit key presses during the call as "out-of-band events." There are several known methods for transmitting DTMF in SIP networks: RFC 2833, SIP INFO (RFC 2976), and in-band. RFC 2833 defines a special packet that includes a payload format for carrying DTMF digits. When a provider such as described above integrates with a VoIP carrier, the provider must be able to distinguish when a customer has pressed a "digit" on a keypad, irrespective of whether that customer is connected through a conventional TDM system or through VoIP. Typically, there are multiple ways to detect whether the customer has pressed a digit (to generate DTMF signaling). As noted above, that signaling may be received and passed through to the service provider as in-band signaling, or it may be passed through to the provider as an RTP payload, per RFC 2833, or (more commonly), both types of signaling may occur at the same time (over the same connection). When a service provider integrates with the carrier, theoretically the carrier provides an indication of how such digits are expected to be passed. In practice, however, the carrier may not send the digits in the manner that has been negotiated. Or, when the service provider works with multiple carriers, the various carriers may operate with different implementations and/or interpretations of the standards may apply to the signaling. As such, it is often the case that the provider receives signaling or other information representative of DTMF digits but cannot distinguish the true nature of the customer's action.

BRIEF SUMMARY

A method to discriminate a signal as a DTMF digit is operative in a service provider having a VoIP-based media server (e.g., an MRCP (Media Resource Control Protocol) server). The media server comprises a digit detection module (e.g., based on FreeSWITCH) that receives as input a data stream that may include one or more DTMF digits. The digit detection module processes the input data stream and provides, as output, an indication of what digit(s) have been detected and from what source (e.g., in-band audio, an RTP 2833 telephone event, of both). The output of the digit detection module is then further processed by a discrimination (or "filtering") algorithm to make a final digit determination. This algorithm preferably executes in an input handler. To that end, the algorithm discards an in-band audio digit if the input handler has received any RTP telephone event (corresponding to the same identified digit) since a last codec negotiation between the server and the carrier. In addition, the algorithm discards any RTP telephone event if a previously-accepted digit has the same value and is in-band audio. Finally, and to address digits that may overlay one another (e.g., that may have passed through multiple carriers before reaching the service provider), the algorithm also discards duplicate in-band digits if a gap between the digits is below a configured threshold. Thus, according to this technique, both in-band DTMF and RTP telephone events are accepted by the server, regardless of what has been negotiated with the carrier(s). If RTP telephone events are detected, the algorithm prefers them and ignores in-band DTMF until the call ends or the media is re-negotiated. The approach detects when duplicate digits of differing types are initially received and only accepts one of them, regardless of spacing or duration.

The foregoing has outlined some of the more pertinent features of the subject matter. These features should be construed to be merely illustrative. Many other beneficial results can be attained by applying the disclosed subject matter in a different manner or by modifying the subject matter as will be described.

DETAILED DESCRIPTION

Figure 1:
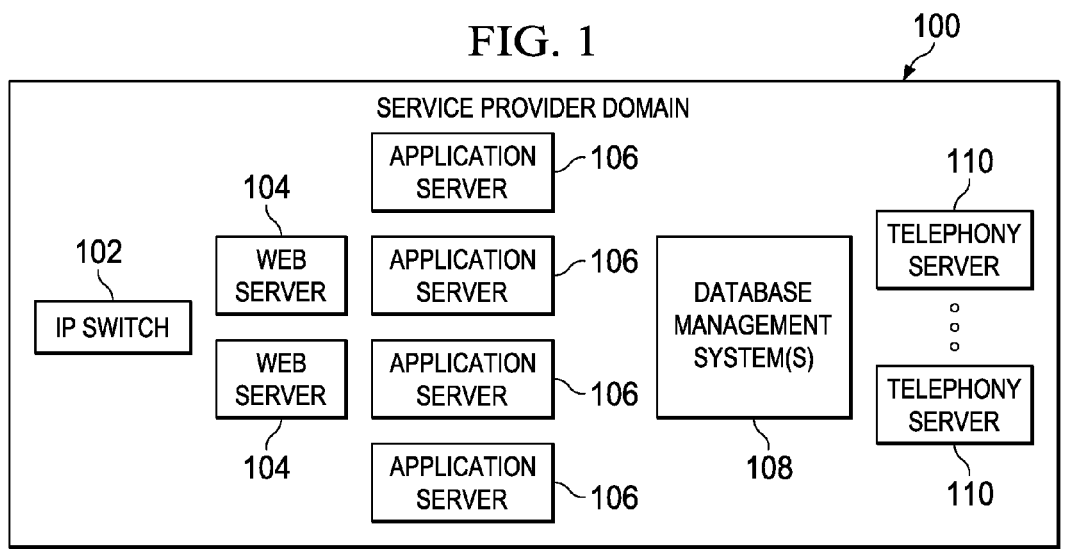
FIG. 1 is a block diagram of a service provider infrastructure for implementing a managed communications campaign service and in which the subject matter of this disclosure may be implemented.

The technique herein may be used by a service provider that enables personalized, multi-channel customer communications. FIG. 1 illustrates a representative service provider or system architecture of this type. The approach is not limited for use with a service provider that provides customer communications, as it may also be implemented by other entities.

The service provider architecture typically is implemented in or across one or more data centers. A data center typically has connectivity to the Internet. Generally, and as well-known, the system provides a web-based hosted solution through which business entities create and manage communications campaigns. Campaigns may be interactive or non-interactive. Representative campaigns include, without limitation, account renewal campaigns, balance transfer or consolidation offer campaigns, billing issue campaigns, credit card activation campaigns, fraud alert campaigns, payment or past due reminder campaigns, phone or customer survey campaigns, debt recovery campaigns, late payment with right party verification campaigns, payment reminder with direct connect to call center campaigns, appointment reminder campaigns, welcome call campaigns, account renewal campaigns, affinity cross-sell/rewards program campaigns, crisis management/disaster recovery campaigns, new product offer campaigns, inquiry/web follow-up campaigns, contract renewal campaigns, service availability notification campaigns, promotional offer campaigns, service delivery confirmation campaigns, auto-responder campaigns, trivia/sweepstakes campaigns, marketing alert campaigns, and the like. The particular type of campaign is not a limitation or feature of the invention.

In a well-known operation, a business entity (a "client") user has a machine such as a workstation, notebook or laptop computer, tablet or other mobile device. Typically, a business entity user accesses the service provider architecture by opening a web browser on the machine to a URL associated with a service provider domain. (In an alternative, the client may operate its own dedicated client application in lieu of a web browser to access a server side of the application.) Access may also be through an automated process, such as via a Web services application programming interface (API). Where a web browser is used, the client authenticates to the managed service in the usual manner, e.g., by entry of a username and password. The connection between the business entity machine and the service provider infrastructure may be encrypted or otherwise secure, e.g., via SSL, or the like. Although connectivity via the publicly-routed Internet is typical, the business entity may connect to the service provider infrastructure over any local area, wide area, wireless, wired, private or other dedicated network. As seen in FIG. 1, the service provider architecture 100 comprises an IP switch 102, a set of one or more web server machines 104, a set of one more application server machines 106, a database management system 108, and a set of one or more telephony server machines 110. A representative web server machine 104 comprises commodity hardware (e.g., Intel-based), an operating system such as Linux, and a web server such as Apache 2.x. A representative application server machine 106 comprises commodity hardware, Linux, and an application server such as WebLogic 9.2 (or later). The database management system 108 may be implemented as an Oracle (or equivalent) database management package running on Linux. A representative telephony server machine is an application server that implements appropriate software applications for call set-up, voice processing, and other call connection and management activities. An application may implement the Media Resource Control Protocol (MRCP). In the alternative, a telephony server machine may execute an application server in conjunction with one or more PSTN, VoIP and/or voice processing cards that provide interconnectivity for telephone-based calling applications. In a card-based embodiment, a representative card is a CG 6565 (or variant) series available from Dialogic, or an equivalent. Typically, a voice processing application port or card has a finite number of supported ports. In a high volume call environment, there may be several web server machines, several application server machines, and a large number of telephony server machines. Although not shown in detail, the infrastructure may include a name service, FTP servers, MRCP (Media Resource Control Protocol) servers, load balancing appliances, other switches, and the like. Each machine typically comprises sufficient disk and memory, as well as input and output devices. The software environment on each machine includes a Java virtual machine (JVM) if control programs are written in Java. Generally, the web servers 104 handle incoming business entity provisioning requests, and they export a management interface that is described in more detail below. The application servers 106 manage the basic functions of generating campaign scripts, managing contacts, and executing campaigns. The telephony servers 110 handle most telephony-related functions including, without limitation, executing outbound calls and forwarding calls to a contact center. The particular hardware and software implementation details described herein are merely for illustrative purposes are not meant to limit the scope of the present invention.

In a representative embodiment, a typical machine in the service infrastructure is a processor-based server running Linux, and the server includes a telephone interface. A typical interface has up to 200 ports, and each port may be considered a separate telephone line. There are typically a set of such servers operating at a given location (e.g., an Internet data center). The following is a typical operation of the service. Using a Web browser or the Web service API, a client provisions a campaign, provisioning a script to be played to a target customer. The scope and content of the script will depend on the campaign. The client also provides the service provider with contact information for a set of persons, who are the target recipients of the campaign. In operation, the system batches a subset of those contacts to one of the machines in the server farm.

Figure 2A:
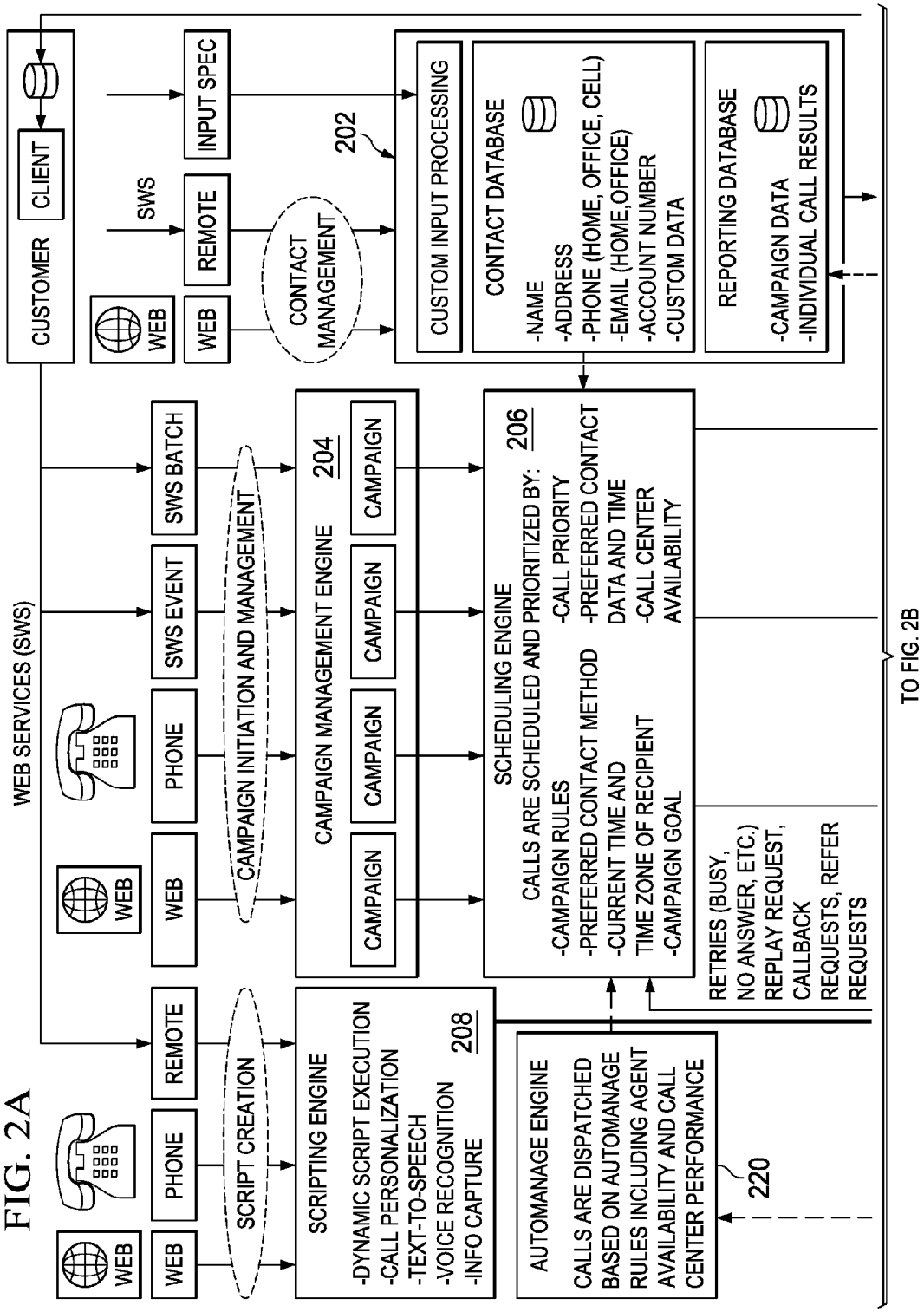
FIGS. 2A-2B illustrate how an interactive communications campaign is created and managed in the service provider infrastructure illustrated in FIG. 1.
Figure 2B:
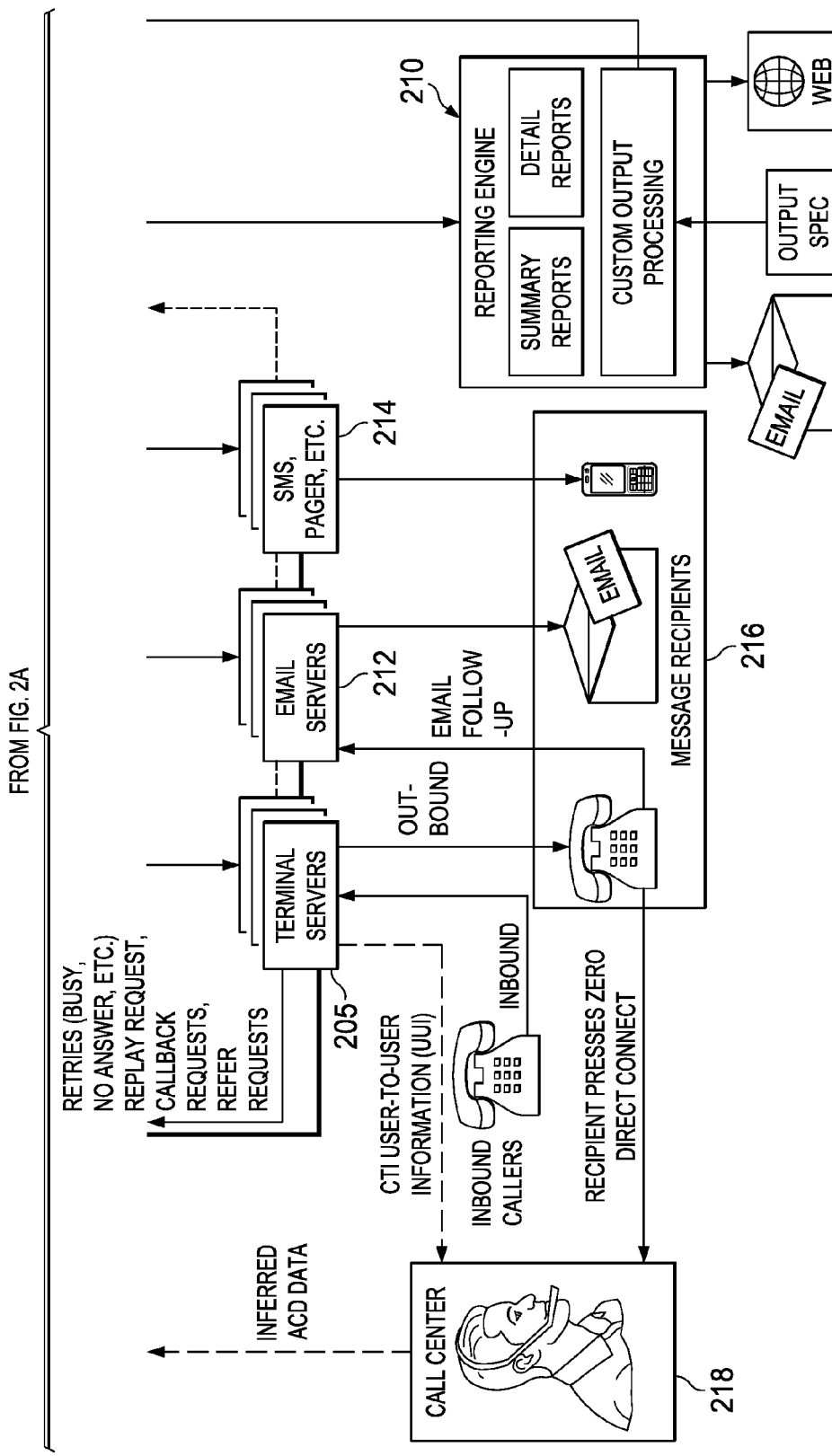

Using the service provider infrastructure, a business entity can create, execute and manage a campaign. As noted above, a campaign may have associated therewith one or more "sub-campaigns." Using a Web interface, a client loads a list of contacts who will be called and associates that list with a script. A "sub-campaign" refers to one or more passes through a contact list that has been bound to a script and that has been associated with a given timeframe. Thus, a "sub-campaign" associates at least the following items: a list of contacts, a script, and a timeframe. Additional details regarding sub-campaigns are set forth below. A script determines what will happen during a phone call. Typically, a script is formatted as XML and specifies a sequence of audio prompts that are played and what happens when the recipient takes certain actions such as pressing a button on the phone or speaking a response. One or more contact lists are stored in a contact database, and typically a contact list comprises a set of contacts. A contact typically is an individual in the contact database, and this individual is sometimes referred to as the "customer" (as, technically, the individual is a customer of the client using the managed service). A contact can include home, work or cell numbers, a client identifier, an email address, or the like. Also, contacts typically include first name, last name, company and other information. With reference to FIGS. 2A-2B, and as described above, a business entity connects to the service provider, authenticates, and then uses one or more applications to create, execute and manage the campaign. These applications execute on the application server machines and operate in association with one or more databases that are supported within the database management system. These applications include, for example, a contact management application 202, a campaign management engine 204, a scheduling engine 206, and a scripting engine 208. The contact management application 202 handles the receipt and storage of the contact list(s) uploaded (e.g., via FTP or otherwise) to the system by or on behalf of the business entity client. The scripting engine 208 handles the creation and managing of the campaign scripts, using instructions entered by or on behalf of the business entity client via a web-based interface or Web services API. The campaign management engine 204 manages the campaign by interoperating with the scheduling engine 206, which in turn interoperates with the telephony servers 205 to execute the campaign. The business entity client evaluates or monitors the campaign from summary, detail and/or custom reports generated by a reporting engine application 210. Campaign evaluation and monitoring may also be performed via a Web-based user interface, or in an automated manner via an API. Notification campaigns are executed using email servers 212 and SMS (or MMS) servers 214, or by other means, such as by telephone.

As also illustrated in FIGS. 2A-2B, after connecting an outbound call to a target customer 216, the customer may elect to be connected to the contact center 218 (typically a third party call center) or the system may perform that direct connect automatically once it determines that a human being (as opposed to an answering machine) has answered the outbound call. The system typically obtains information about the contact center's performance during a given communications campaign, commonly without requiring a direct connection between the infrastructure and a contact center's on-premises ACD. This enables the managed service provider to integrate with both its business entity clients and with their associated contact center environments rapidly and efficiently. The interconnectivity between the managed service provider and the contact center may be "inferred" from how calls that originate from the service provider to the target recipients (who have expressed an interest in being connected to the contact center) are actually handled. This "indirect" connectivity is provided by the control engine 220, which is responsible for dispatching calls at an appropriate rate while ensuring that all customer-requested rule parameters are honored.

As noted above, preferably a web-based interface is provided to enable a business entity client to create a set of one or more management rules that, when triggered during the campaign, cause the infrastructure (and, in particular, certain control applications therein) to take certain control actions in real-time, preferably based on campaign performance.

A "campaign" refers to an overall series of calls to a contact list using one or more sub-campaigns that use a given script. Campaigns also act as templates for the sub-campaigns that are created under them. A campaign typically has a preset configuration that applies to all of its sub-campaigns. As noted above, a "sub-campaign" refers to one or more passes through a contact list using a script and that is constrained to a particular timeframe (or at a set of one or more such times). A sub-campaign typically runs under an existing campaign. A "script" as noted above determines what happens during a phone call. Typically, the script specifies a sequence of audio prompts that are played to a client (an end user who receives a call) and what happens (the contact center connection) when the recipient takes certain actions (such as pressing a button on the phone or speaking an answer to a query). The script may also specify other actions, such as effecting a contact center connection automatically when detecting that a human being has answered. The nature and type of actions set forth in a script thus may be quite varied, and this disclosure is not limited to any particular process flow within a script.

The hosted service typically also includes a preference management (PM) module (or platform). The PM system maintains a set of consumer preferences or attributes related to communication and behavior. These include, among many others, opt-in, opt-in date, opt-in method, and opt-in user. The service maintains databases of such opt-in preferences and values. Preferably, consumer preferences are created, maintained and accessed in one of several ways: via a web-based portal, via a voice portal, via an application programming interface (API), or via a mobile or smartphone application. The users of the preference management system typically include, without limitation, a client administrator, a client customer service representative, or the consumer himself or herself (in other words, the client's customers).

The users of the PM function are administrators, customer service representatives and consumers. Client administrators log into the preference management system to setup and manage preference management list, view preference management system status, run preference management reports, create or disable user logins for customer service representatives, designate a CSR as read-only (not allowed to edit attributes or subscriptions), designate a CSR as read/write (allowed to edit attributes and subscriptions, subject to access control lists (ACLs) on attributes), change passwords for customer service representatives, and generate and export a preference list on Consumer preferences. CSRs log into the platform to search for a consumer, view consumer preferences (as permitted by an access control list or ACL), and edit consumer preferences (as permitted by an ACL). Some customer service representatives may have permission to edit preferences, while others may only have permission to search for and view such preferences. Consumers log into the preference management platform to view his/her preferences (as allowed by ACLs), and to edit his/her preferences (as allowed by ACLs). The target users log into the system via a web user interface, a voice portal, or some other interface, e.g., one provided by a third party via the API.

Robust DTMF Detection in an Unreliable VoIP Environment

With the above as background, the technique of this disclosure is now described. Without meant to be limiting, the techniques herein typically are implemented during a given outbound call, wherein a customer (having been afforded an option to connect to a contact center, e.g., to speak to a customer representative) executes a keypad press. The customer is connected to his or her carrier using TDM or VoIP, and the carrier communicates the resulting data stream (directly or via another carrier) to the media server. The service provider server then needs to detect the actual customer keypad press, i.e., to determine whether information in the data stream represents a DTMF digit (and, if so, what digit). During this detection process, the media server also must be able to discriminate information in the received data stream that may indicate a duplicate of the received digit. The techniques herein provide this functionality, as will now be described.

Figure 3:
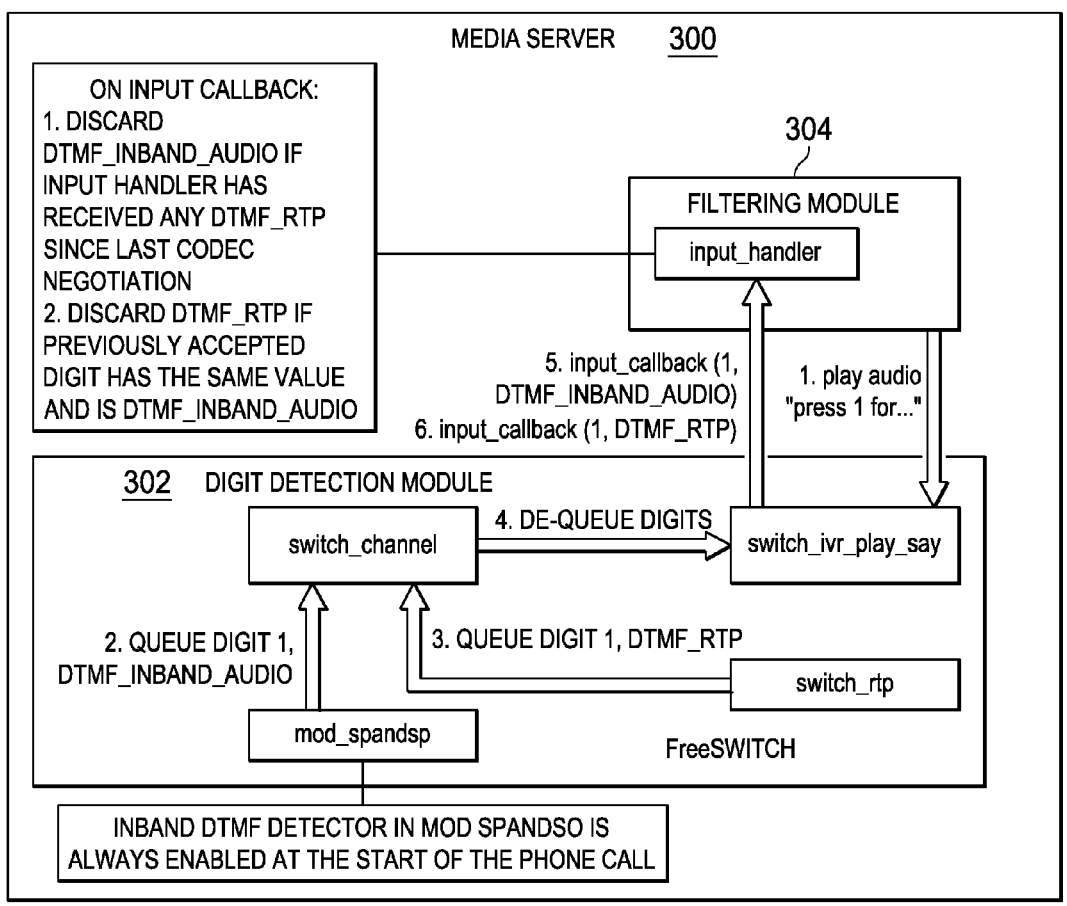
FIG. 3 illustrates a media server that includes a digit detecting mechanism according to this disclosure.

Referring now to FIG. 3, preferably the techniques herein are implemented in a media server of the type described and that is connectable to one or more carriers including, at least one VoIP-based carrier. The media server executes a digit detection and discrimination mechanism, typically as software executing on a hardware processor. According to the technique, instead of configuring the detection mechanism to prefer just one type of digit (in-band or RTP), both in-band and RTP telephone events are accepted by the mechanism, regardless of what has been negotiated with a carrier. Generally, if RTP telephone events are detected, they are preferred and in-band DTMF is ignored until the call ends or the media is re-negotiated. As a result, the mechanism prefers RTP telephone events even though the carrier has indicated (e.g., via a negotiation) that it is sending in-band DTMF. In operation, the mechanism detects when duplicate digits of differing types (e.g., in-band DTMF or RTP telephone events) are initially received and only accepts one of them, regardless of spacing or duration. This approach is effective when dealing with RTP telephone events that are preceded by a piece of in-band DTMF that was not completely squelched (by the carrier) during transmission back to the media server.

As illustrated, the media server 300 comprises the digit detection and discrimination mechanism, which preferably includes two (2) modules: a digit detection module 302, and a filtering module 304. These modules are shown as distinct for discussion purposes but their functionality may be integrated. Typically, the module 302 is based on FreeSWITCH and includes several processing functions, which are well-known. Typically, in-band DTMF detection is enabled at the beginning of the outbound call. The module also initiates other call processing functions, such as adaptive jitter buffering with packet loss concealment. At (1), a "switch_ivr_play_say" function receives, as input, a data stream that may include DTMF digit data. At (2), a "mod_spandsp" function identifies a received digit as DTMF in-band audio and, as such, provides an indication (DTMF_INBAND_AUDIO) to this effect, identifying the digit (in this example, a "1"). At (3), another function, called "switch_rtp," identifies a received event as RFC 2833 telephone event packet and, as such, provides an indication (DTMF_RTP) to this effect, identifying the digit. These inputs are provided to a "switch_channel" function that includes a queue that corresponds to the current telephone connection from the carrier. As illustrated, events passed from the mod_spandsp and switch_rtp functions are queued into the switch_channel and (at step (4)) made available to the switch_ivr_play_say function, which determines whether any digits have been collected. At step (5) and (6), the module 302 outputs the de-queued digits. In this implementation, the digits are output as a pair of input_callbacks: (5) input_callback (1, DTMF_INBAND_AUDIO) and (6) input_callback (1, DTMF_RTP). This indicates that module 302 has determined that both types of the "1" digit are present in the input stream. A determination must then be made to determine whether these represent the same (namely, duplicate) digits.

Thus, according to this disclosure, instead of detecting just one type of digit, the module 302 sends all digits (i.e., both in-band DTMF and RTP telephone events embedded in the data stream) to the filtering module 304. The filtering module 304 (which may be implemented as a FreeSWITCH plug-in (or the like)), then provides the final discrimination. To that end, the filtering module 304 includes an input handler routine that operates as follows. On input_callback from the module 302, the algorithm discards DTMF_INBAND_AUDIO if the input handler has received any DTMF_RTP (corresponding to the same identified digit) since a last codec negotiation between the server and the carrier. In addition, the algorithm discards any DTMF_RTP if a previously-accepted digit has the same value and is DTMF_INBAND_AUDIO. Finally, and to address digits that may overlay one another (e.g., that may have passed through multiple carriers before reaching the service provider), the algorithm also discards duplicate in-band digits if a gap between the digits is below a configured threshold. The module 304 also discards a telephone event if a previous digit was an in-band digit of the same value. The filtering module also may log a warning if a mismatch (between a negotiated in-band DTMF and received RTP event, or vice versa) is detected.

As described above, according to this disclosure, a method to discriminate a signal as a DTMF digit is operative in a service provider having a VoIP-based media server. The media server accepts both in-band DTMF and RTP telephone events. A digit detection module receives as input a data stream that may include one or more DTMF digits. The module processes the input data stream and provides, as output, an indication of what digit(s) have been detected and from what source (e.g., in-band audio, an RTP 2833 telephone event, of both). The output is then further processed by a discrimination algorithm to make a final digit determination. If RTP telephone events are detected, the algorithm prefers them and ignores in-band DTMF until the call ends or the media is re-negotiated. The approach detects when duplicate digits of differing types are initially received and only accepts one of them, regardless of spacing or duration.

While the technique described above has been described in the context of a FreeSWITCH implementation, this is not a limitation. Moreover, the discrimination functionality may be used with other types of RTP events.

More generally, the technique may be implemented as a computer program, namely, as a set of computer program instructions executed by one or more data (hardware) processors.

As previously noted, the hardware and software systems in which the subject matter herein is illustrated are merely representative. The described functionality may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation. A given machine includes network interfaces and software to connect the machine to a network in the usual manner. As illustrated in FIG. 1, the subject disclosure may be implemented as a managed service (e.g., in a platform-as-a-service (PaaS) model) using the illustrated set of machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions (such as the various functions described above and illustrated in FIG. 3) may be combined or shared in given instructions, program sequences, code portions, and the like.

Preferably, the functionality is implemented in an application layer solution, although this is not a limitation. The functionality may be implemented with application layer protocols such HTTP and HTTPS, or any other protocol having similar operating characteristics.

Having described our invention, what we now claim is set forth below.

The invention claimed is:

1. A media server connectable to at least an Internet telephony carrier, the media server comprising:
a switch adapted to connect telephony devices during an outbound call;
processor coupled to the switch; and
memory, wherein the memory has stored therein instructions that, when executed by the processor, cause the processor to:
receive a data stream from the Internet telephony carrier during the outbound call, wherein the received data stream includes an in-band dual-tone multi-frequency (DTMF) event data and a real-time transport protocol (RTP) event data;
identify the Internet telephony carrier as being configured to send in-band DTMF event data;
discard the in-band DTMF event data from the data stream; and
identify a user input based on the modified data stream, wherein in response to the identified user input, the switch establishes the connection of the telephony devices.

2. The server of claim 1, wherein the DTMF event data identifies a keypad digit selected by a target of the outbound call.

3. The server of claim 1, wherein the in-band DTMF event data is discarded until media is re-negotiated with the Internet telephony carrier.

4. The server of claim 1, wherein the in-band DTMF event data is discarded until the end of the outbound call.

5. The server of claim 1, wherein the DTMF event data and the RTP event data have a same value.

6. The server of claim 1, wherein the instructions further cause the processor to:
receive duplicate in-band DTMF signals; and
discard one of the duplicate in-band DTMF signals if a gap between a first one of the duplicate signals and a second one of the duplicate signals is below a configured threshold.

7. A method comprising:
connecting telephony devices, by a switch, during an outbound call;
receiving, by a processor coupled to the switch, a data stream from an Internet telephony carrier during the outbound call, wherein the received data stream includes an in-band dual-tone multi-frequency (DTMF) event data and a real-time transport protocol (RTP) event data;
identifying, by the processor, the Internet telephony carrier as being configured to send in-band DTMF event data;
discarding, by the processor, the in-band DTMF event data from the data stream; and
identifying, by the processor, a user input based on the modified data stream, wherein in response to the identified user input, the switch establishes the connection of the telephony devices.

8. The method of claim 7, wherein the DTMF event data identifies a keypad digit selected by a target of the outbound call.

9. The method of claim 7, wherein the in-band DTMF event data is discarded until media is re-negotiated with the Internet telephony carrier.

10. The method of claim 7, wherein the in-band DTMF event data is discarded until the end of the outbound call.

11. The method of claim 7, wherein the DTMF event data and the RTP event data have a same value.

12. The method of claim 7 further comprising:
receiving, by the processor, duplicate in-band DTMF signals; and
discarding, by the processor, one of the duplicate in-band DTMF signals if a gap between a first one of the duplicate signals and a second one of the duplicate signals is below a configured threshold.

* * * * *